US006608913B1

(12) United States Patent
Hinton et al.

(10) Patent No.: US 6,608,913 B1
(45) Date of Patent: Aug. 19, 2003

(54) SELF-CONTAINED MAPPING AND POSITIONING SYSTEM UTILIZING POINT CLOUD DATA

(75) Inventors: Eric Herbert Hinton, Lively (CA); Donald Ray Murray, Vancouver (CA)

(73) Assignee: Inco Limited, Toronto (CA)

( * ) Notice: Subject to any disclaimer, the term of this patent is extended or adjusted under 35 U.S.C. 154(b) by 582 days.

(21) Appl. No.: 09/619,076

(22) Filed: Jul. 17, 2000

(51) Int. Cl.[7] .................................................. G06K 9/00
(52) U.S. Cl. ........................................ 382/104; 382/291
(58) Field of Search ................................. 382/103, 104, 382/291; 356/237.3, 237.4; 702/5; 348/94; 250/442.11, 206.1; 340/988, 992; 700/66, 135; 701/208

(56) References Cited

U.S. PATENT DOCUMENTS

| | | | |
|---|---|---|---|
| 3,805,261 A | | 4/1974 | Deschamps et al. .......... 342/64 |
| 5,530,330 A | | 6/1996 | Baiden et al. ............... 318/580 |
| 5,644,317 A | | 7/1997 | Weston et al. ......... 342/357.14 |
| 5,848,115 A | * | 12/1998 | Little et al. ...................... 378/4 |
| 5,880,809 A | * | 3/1999 | Lieberman et al. ..... 351/160 R |
| 5,999,865 A | | 12/1999 | Bloomquist et al. .......... 701/25 |
| 6,253,164 B1 | * | 6/2001 | Rohm et al. .................... 703/2 |
| 6,278,460 B1 | * | 8/2001 | Myers et al. ................ 345/424 |
| 6,512,993 B2 | * | 1/2003 | Kacyra et al. .............. 702/159 |

FOREIGN PATENT DOCUMENTS

| | | | |
|---|---|---|---|
| CA | 2328227 | 4/1999 | ............. G01S/5/00 |
| EP | 0636901 A2 | 2/1995 | ............ G01S/17/02 |
| EP | 0636901 A3 | 2/1995 | ............ G01S/17/02 |
| EP | 0989353 A2 | 3/2000 | ............. F17D/5/00 |
| EP | 0989353 A3 | 8/2001 | ............. F17D/5/00 |
| JP | 8219734 A | 8/1996 | ............ G01B/11/24 |

* cited by examiner

Primary Examiner—Andrew W. Johns
Assistant Examiner—Shervin Nakhjavan

(74) Attorney, Agent, or Firm—Edward A. Steen

(57) ABSTRACT

A self-contained mapping and positioning system for underground mining is provided that is capable of mapping the topography of a region, such as a mine tunnel, and further being able to use the mapped data to determine the position of an object, such as a mining vehicle, within the mine tunnel. The system includes an inertial navigation system, a central processing unit, a three-dimensional database, a three-dimensional camera system, an operator console and a survey system having a three-dimensional laser scanner. The survey system using the three-dimensional laser scanner produces point cloud data, i.e., a set of data points representing the topography of the region. The point cloud data is stored within a storage device until the entire region is mapped and then transmitted to the operator console to be post processed. After post processing, the data is exported to the three-dimensional database and the indexed for ease of use by the central processing unit. To determine the position of the object within the region, the system of the instant invention initializes the object in its current position. The object is then either remotely or directly guided to another position from the current position where it is brought to an estimated position by the inertial navigation system or is remotely controlled for performing work, e.g., drilling a mine heading. After a predetermined time of moving the object, there is an error in the position of the object and the operator console makes a call to the central processing unit on board the object to automatically calculate the true position based on the point cloud data stored within the database to update the position of the object. This is done by approximating a search range for the database according to the estimated position. A subset of data corresponding to the search range is removed from the database. The three-dimensional camera system then scans images of the surface in proximity to the object and converts the images to a patch of point cloud data. The patch of point cloud data is then matched against the subset of data corresponding to the search range of point cloud data removed from the three-dimensional database until there is less than a predetermined minimum error distance. At that point, the true position of the object is known. This new position is then put back into the inertial navigation system and the positional data of the object is updated with the correct positional data.

28 Claims, 4 Drawing Sheets

SELF-CONTAINED MAPPING AND POSITIONING SYSTEM UTILIZING POINT CLOUD DATA

TECHNICAL FIELD

The instant invention relates to mapping and positioning techniques in general and, more particularly, to a self-contained mapping and positioning system especially suited for determining the position of an object located within a region, such as a mining vehicle within a mine tunnel, utilizing point cloud data, i.e., a set of data points representing the topography of the region.

BACKGROUND ART

Mine tunnel outline plan views ("TOPES") are required for underground mine planning. Present techniques require teams of skilled surveyors using conventional surveying techniques and equipment to physically traverse the stopes and drifts to obtain the raw data for the topes. The raw data consists of point-to-point measurements. The mapping data collected by the surveyors is imported into a CAD package to produce mine tunnel plan views.

Sending surveying crews into underground excavations can be tedious work. Moreover, the assembling and utilization of highly skilled personnel contributes to the cost of underground mining.

Due to the ceaseless press of cost reduction and heightened safety concerns, there is a continuing desire on the part of hard rock miners to automate mining systems. By automating as many and minimizing cycles as possible, the dangers and expenses caused by the presence of personnel at the actual working zones of the mine may be reduced. By placing the miner or other mine professional in a safe and secure remote location, preferably at the surface, increased safety, cost efficiency and production are encouraged.

In particular, robotic mining techniques require dependable mapping, navigation and positioning systems. For surface mining (as well as other activities), increasing success has been found with the use of global positioning systems utilizing earth satellite navigation.

However, in underground mines and in certain surface structures, the signals from the orbiting satellites cannot reach the targeted equipment. Accordingly, sophisticated dead reckoning systems have been developed. Typical systems utilize sound, electromagnetic means (lasers, visible light, radar) or gyroscopes or combinations thereof to remotely guide and operate mobile underground equipment.

A difficulty with remotely operated equipment is securing an initial reference datum point in X-Y-Z space. Due to the relative complex location algorithms used in navigation systems, the jumping off point must be measured with great accuracy otherwise even small errors will quickly become magnified thereby throwing off the reconnoitering ability of the apparatus. This problem is especially onerous if a toping system is involved. Any deviation may render the resulting map worthless when critical parameters are at stake.

Further, dead reckoning systems, may render false mapping, navigation and positioning readings due to natural phenomenon, such as electrical storms, and the uneven, crater-like surface of the mine or an overhead surface which tend to roll and shake the vehicle carrying laser equipment and/or gyroscopes.

Accordingly, there is a need to produce less labor intensive accurate topes of underground regions, enclosed structures, and overhead surfaces for later use in navigating and positioning an object, such as a mining vehicle within a mine tunnel.

A need also exists in developing a self-contained mapping and positioning system which does not use global positioning and dead reckoning systems in positioning an object and determining the position of the object within a region after an initial reference position of the object is known.

SUMMARY OF THE INVENTION

There is provided a self-contained mapping and positioning system that is capable of mapping the topography of a region, such as a mine tunnel, and further being able to use the mapped data to determine the position of an object, such as a mining vehicle within the mine tunnel. The system includes an inertial navigation system, a central processing unit, a three-dimensional database, a three-dimensional camera system, an operator console and a survey system having a three-dimensional laser scanner.

The survey system which is capable of an accuracy of ½ mm over 12 m is attached to a vehicle that is remotely operated through the region. The survey system using the three-dimensional laser scanner produces point cloud data, i.e., a set of data points representing the topography of the region, as well as raster imagery. The point cloud data is stored within a storage device until the entire region is mapped and then is transmitted to the operator console to be post processed. The post processing involves the consolidation and verification of the data collected in the field and setting the data in the requested coordinates. The final step is the exporting of the information to the three-dimensional database and the indexing of the data for ease of use by the central processing unit.

To determine the position of the object within the region, the system of the instant invention initializes the mining vehicle in its current position or initial reference point ("IRP"), as described in co-pending U.S. patent application Ser. No. 09/515,299 titled "Automated Guided Apparatus Suitable for Toping Applications" filed on Feb. 29, 2000 and having a common assignee; the contents of which are incorporated herein by reference. The IRP is fixed with respect to the point cloud data stored within the database. The object is then either remotely or directly guided from the IRP to another position where it is brought to an estimated position by the inertial navigation system or is remotely controlled for performing work, e.g., drilling a mine heading.

After a predetermined time of moving the object, there is an error in the position of the object and the operator console makes a call to the central processing unit on board the object to automatically calculate the true position based on the point cloud data stored within the database to update the position of the object. This is done by approximating a search range for the database according to the estimated position. A subset of data corresponding to the search range is removed from the database. The three-dimensional camera system then scans images of the surface in proximity to the object and converts the images to a patch of point cloud data. The patch of point cloud data is then matched using a matching algorithm against the subset of data corresponding to the search range of point cloud data removed from the three-dimensional database until there is less than a predetermined minimum error distance, preferably, in the range of 2–4 cm. At that point, the true position of the object is known. This new position is then put back into the inertial navigation system and the positional data of the object is updated with the correct positional data.

The invention is especially useful for guiding a mining vehicle within a mine tunnel from an initial reference point, determining the position of the mining vehicle with respect to the initial reference point, and updating the positional data associated with the mining vehicle. It also may be used for guiding, determining the position, and updating the positional data of other objects, such as overhead surface vehicles.

PREFERRED EMBODIMENT OF THE INVENTION

Figure 1:
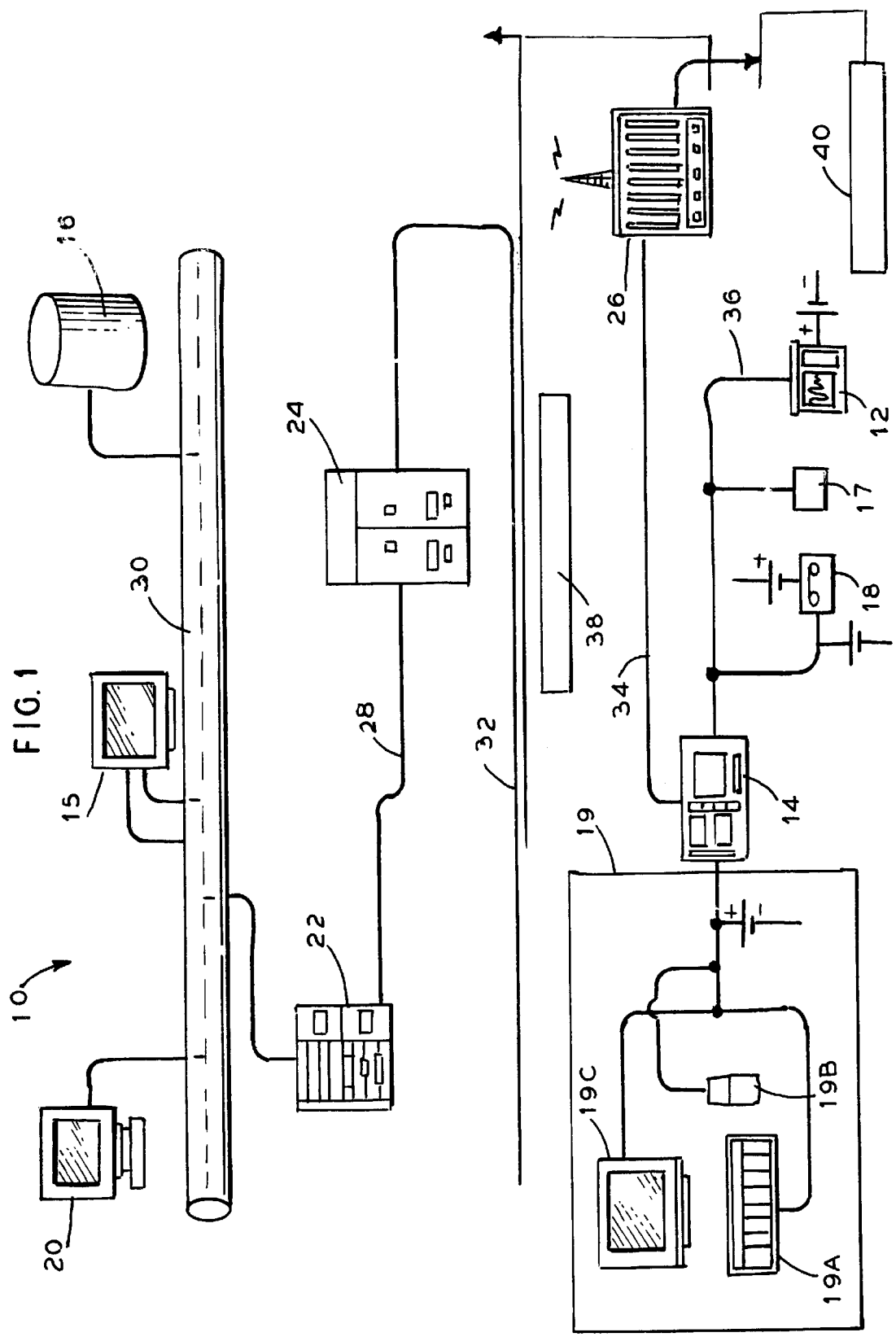
FIG. 1 is a schematic representation of an embodiment of a self-contained mapping and positioning system of the invention.

Referring to FIG. 1, there is shown a schematic diagram of a self-contained mapping and positioning system that is capable of mapping the topography of a region, such as a mine tunnel, and further being able to use the mapped data to determine the position of an object, such as a mining vehicle, within the mine tunnel. The invention is described herein in the context of guiding a mining vehicle located within a mine tunnel from an initial reference point, determining the position of the mining vehicle with respect to the initial reference point, and updating the positional data associated with the mining vehicle.

It is contemplated that the system may also be used in guiding, determining the position, and updating the positional data of any object situated within any enclosure, such as a mine, tunnel, cave, building, etc., or overhead (i.e., external) surface, such as a rocky terrain. It is also contemplated that the system may also be used to map and represent the topography of any region in point cloud data, including a mine, tunnel, cave, building, overhead (i.e., external) surface, etc. In the context of the description herein, the term "mapping the topography of a region" refers to representing the surface features of the region, including its relief and rivers, lakes, etc., and such man-made features as canals, bridges, ditches, roads, walls, furnishings, etc., in point cloud data.

The system designated generally by reference numeral 10 typically includes an inertial navigation system 12, a central processing unit 14, a three-dimensional database 16, a three-dimensional camera system 18, and an operator console 20. The system 10 also includes a process control station 15 for overseeing the entire mining operation and a proximity laser system 17 for determining distance between the mining vehicle and an obstacle, such as a wall of a heading. The proximity laser system 17 is also used to align the mining vehicle, i.e., line up the mining vehicle with a mine heading or face. It is preferred that information transmitted from the proximity laser system 17 is displayed via a window on the operator console 20 for aiding the operator to align the mining vehicle by remote control. Once the mining vehicle is properly aligned, the jacks of the mining vehicle are lowered to stabilize the mining vehicle.

A diagnostic terminal system 19 having a keyboard 19A, a mouse 19B and a monitor 19C is connected to the central processing unit 14 for allowing an operator to periodically run diagnostic procedures and view any system problems on monitor 19C, i.e., for checking the integrity of the system 10. Preferably, the diagnostic terminal system 19 is located overhead, i.e., outside the mine tunnel, and communicates with the central processing unit 14 via appropriate communication means, such as an RS232/422 cable, Ethernet links, underground rated radio frequency links or via other communication methods as known in the art. It is contemplated that the diagnostic terminal system 19 and central processing unit ("CPU") 14 comprise a personal computer ("PC").

The system 10 further includes network devices as known in the art for connecting the various components described above in a network. The network devices typically include a head end 22, a distributed antenna translator ("DAT") 24 and a bridge hub 26. These three network devices are preferably connected via standard network connections. For example, a broadband cable 28 connects the head end 22 with the DAT 24, and a data bus 30 connects the three-dimensional database 16 with the operator console 20 and the head end 22.

A feeder line 32 transmits signals wirelessly from the bridge hub 26 to the DAT 24, an Ethernet line 34 connects the central processing unit 14 with the bridge hub 26, and a cable 36, preferably, an RS 232/422 cable, connects the central processing unit 14 with the inertial navigation system 12, the three-dimensional camera system 18, and the proximity laser system 17. The bridge hub 26 communicates via standard communication techniques as known in the art, e.g., wireless, cable connection, etc., with a teleoperation system 38, i.e., a remote control system, for remotely controlling the mining vehicle and a machine function system 40 for changing operating modes of the mining vehicle and other mining machinery.

The inertial navigation system 12, the central processing unit 14, the three-dimensional camera system 18, and the proximity laser system 17 are located on the mining vehicle. It is contemplated, however, that the central processing unit 14 together with the diagnostic terminal system 19 is located overhead and communicates with the inertial navigation system 12, the three-dimensional camera system 18 and the proximity laser system 17 via at least one transmission medium and via at least the bridge hub 26.

Figure 2:
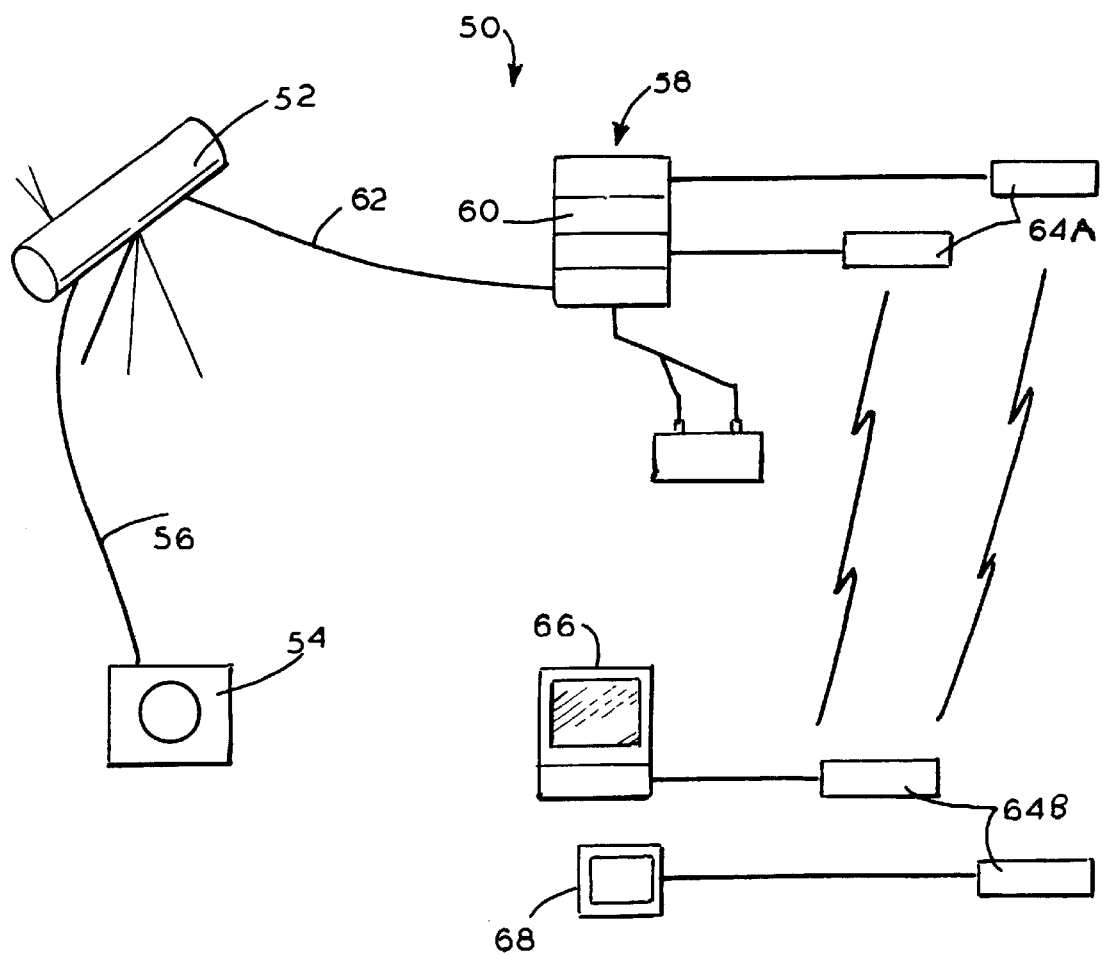
FIG. 2 is a schematic representation of a survey system for use with the system of FIG. 1 for scanning the topography of a region and forming point cloud data.

With reference to FIG. 2, the invention further includes a survey system designated generally by reference numeral 50. The survey system 50 includes a three-dimensional laser scanner 52 attached to a vehicle that is remotely operated through the mine tunnel. The scanner 52 is used to generate a three-dimensional map of the mine tunnel. An air compressor 54 is connected to the scanner 52 via a pressurized cable 56 for keeping debris and dust out of the scanner 52.

Figure 4:
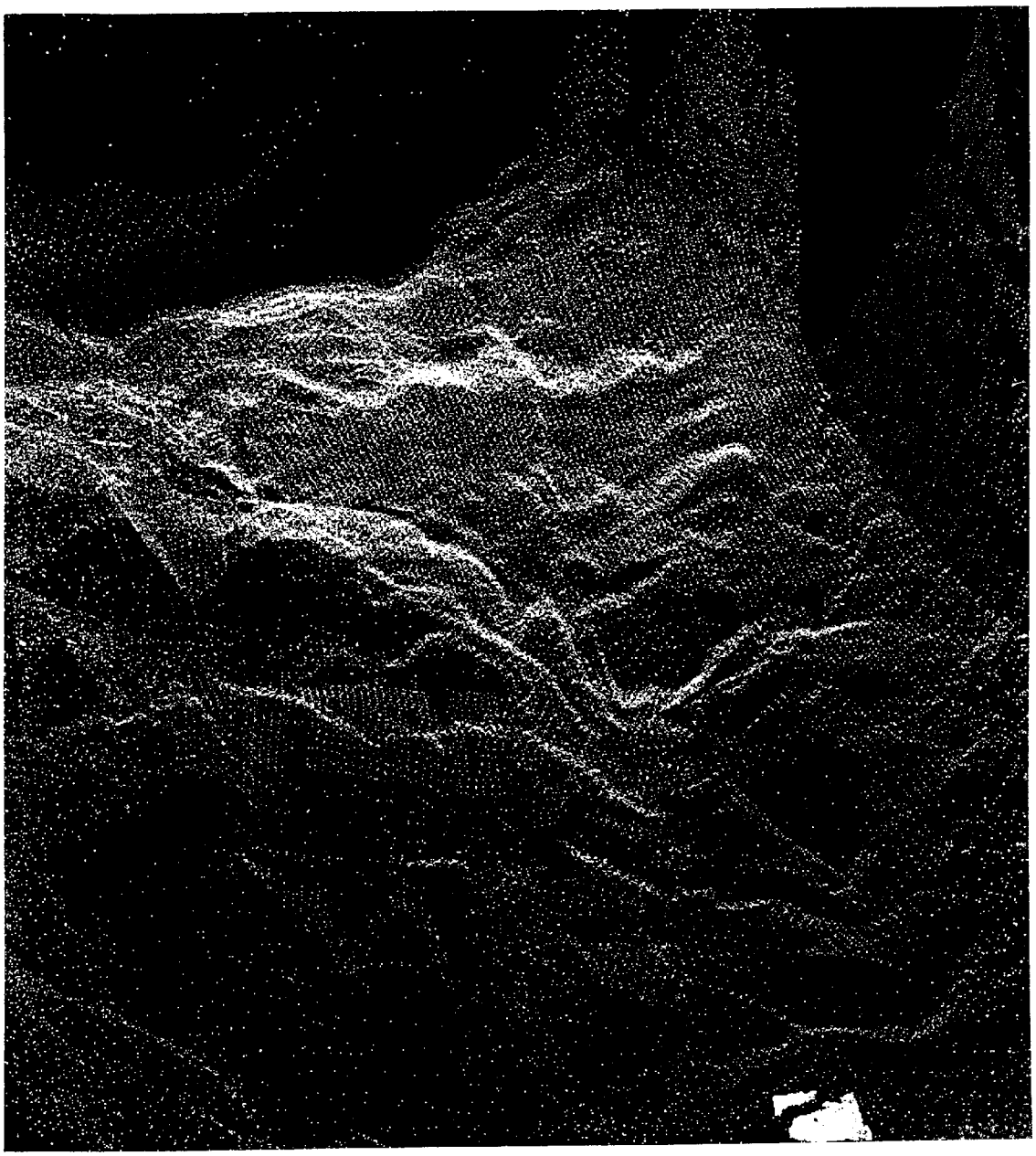
FIG. 4 is an illustration of point cloud data created by the system of FIG. 2.

In operation, as the vehicle is advanced through the mine tunnel, the three-dimensional laser scanner 52 scans the length of the mine tunnel, or a portion thereof. Data processing means 58 (CPU, card, software, etc) having storage means 60 (tape, disc, RAM, etc) is connected to the three-dimensional laser scanner 52 via a cable 62. The data processing means 58 receives the scanned data via the cable 62 from the scanner 52 and converts the scanned data into point cloud data, i.e., a set of multiple data points representing the surface of the mine tunnel, as shown by FIG. 4, and raster imagery, using conventional software as known in the art, such as 3DIPSOS™ available from Mensi, Inc. of Atlanta, Ga. The three-dimensional laser scanner 52 of the survey system 50 is preferably a SOISIC™ sensor having a NTSC video camera available from Mensi, Inc.

Preferably, the survey system 50 is capable of an accuracy of ½ mm over 12 m. The point cloud data for the surface of the mine tunnel is typically stored within the storage means 60 until the scanning operation is complete, i.e., the desired length of the mine tunnel is mapped. The point cloud data is then transmitted, preferably, wirelessly by at least one radio frequency ("RF") modem 64A to at least one other RF modem 64B located overhead, i.e., on the surface, to a computer 66 to be post processed and to a video monitor 68 for viewing the data.

It is contemplated that the computer 66 may be the same as the operator console 20 of FIG. 1. It is further contemplated that the computer 66 may include remote control capabilities for remotely controlling the three-dimensional laser scanner 52.

The post processing of the data involves the consolidation and verification of the data collected in the field and setting the data in the requested coordinates. The final step is the exporting of the data mapping the surface of the mine tunnel from the computer 66 to the three-dimensional database 16 of FIG. 1 and the indexing of the data for ease of use by at least the central processing unit 14 to determine the position the mining vehicle, as further described below.

To determine the position of the mining vehicle, such as the drill jumbo, within the mine tunnel, the inertial navigation system 12 initializes the mining vehicle in its current position as described in co-pending U.S. patent application Ser. No. 09/515,299 titled "Automated Guided Apparatus Suitable for Toping Applications" filed on Feb. 29, 2000 and having a common assignee; the contents of which are incorporated herein by reference. In particular, the mining vehicle is either remotely or directly guided to a known initial position in the mine tunnel, i.e., the initial reference point ("IRP"). The IRP is also a known reference point in the mapping of the mine tunnel stored in the three-dimensional database 16.

A positioner on the mining vehicle using a mounted gyroscopic navigation system having a ring laser gyroscope detects the IRP and establishes its alignment bearings within the mine tunnel. Since external positioning and referencing positions cannot easily reach the interior of the mine tunnel, the mounted gyroscopic navigation device of the inertial navigation system 12 is preferred to negotiate the excavation and determine the IRP.

Due to the relatively irregular floor surface of the mine tunnel with boulders, ruts, contours, irregular surfaces, etc., mechanical rotating mass gyroscopes, sophisticated as they are, may experience jarring and repeated vibrations eventually resulting in errors and physical breakage. A ring laser gyroscope, with no moving parts and robust construction, is preferable, since it stands up well to the rough usage envisioned for mine toping operations.

In brief, a ring laser gyroscope fires opposing laser beams over a closed triangular path. If the gyroscope is at rest, the two beams essentially cancel each other out resulting in a null state as detected by the appropriate sensors. If the gyroscope is moved, the opposing beams are simultaneously slightly foreshortened or lengthened as the case may be resulting in a measurable differential phase change. Using the gyroscope manufacturer's proprietary software, the intelligence can be manipulated to measure the change in position in three dimensions along with the change in pitch, altitude, roll and azimuth.

In particular, Honeywell, Inc. of St. Petersburg, Fla. sells a strapdown civilian inertial navigation system 12 employing a ring laser gyroscope called a Honeywell Ore Retrieval Tunneling Aid ("HORTA"™). The U.S. coal industry utilizes HORTA™ units in some underground continuous mining systems. These mining devices can be partially automated, allowing the operator to monitor a machine's progress from a more secure location. These coal machines are mainly concerned with azimuth whereas hard rock mining applications require azimuth and position.

In a preferred embodiment of the instant invention, the inertial navigation system 12, used to measure changes in location from the known IRP, utilizes the Honeywell HORTA™ and its proprietary software to communicate with the central processing unit 14.

After the inertial navigation system 12 has detected the IRP, the mining vehicle is advanced either directly or by remote control through the mine tunnel or is remotely controlled for performing work, e.g., drilling a mine heading. At a point in time after moving from the IRP, there is an error in the position of the mining vehicle as measured by the inertial navigation system 12. The operator using the operator console 20 makes a call to the central processing unit 14 on board the mining vehicle to automatically calculate the true position of the mining vehicle using the system 10 of FIG. 1. The calculated true position will then be used to update the position of the mining vehicle.

To update the position of the mining vehicle, an algorithm converted into a series of programmable instructions is executed by the central processing unit 14, or other processor within the system, as discussed below in conjunction with FIG. 3, to approximate a search range for the three-dimensional database 16 according to the estimated position as generated by the inertial navigation system 12. A subset of data corresponding to the search range is removed from the database 16 and transmitted to the central processing unit 14.

The three-dimensional camera system 18 then scans images of the surface of the mine tunnel and converts the images using proprietary software similar to the software used by the survey system 50 to a patch of point cloud data. The camera system 18 includes three-lenses for scanning three-dimensional images. In a preferred embodiment, the camera system 18 is the TRICLOPS™ stereo camera system available from Point Grey Research, Inc. of Vancouver, British Columbia, Canada.

The patch of point cloud data is matched using a matching algorithm against the subset of data corresponding to the search range of point cloud data removed from the three-dimensional database 16 until there is less than a predetermined minimum error distance, preferably, in the range of 2–4 cm. In particular, the matching algorithm moves the patch of point cloud data over the search range of point cloud data until the patch of point cloud data approximately corresponds to a portion of the point cloud data removed from the database 16. At that point, the true position of the mining vehicle is known by correlating the matched position in the point cloud data (as removed from the database 16) with the location of the three-dimensional camera system 18 in the mine tunnel.

This new position of the mining vehicle is then put back into the inertial navigation system 12 and the positional data of the mining vehicle is updated with the correct positional data. Preferably, the updated positional data of the mining vehicle is displayed on the operator console 20 and/or the process control console 15 via a window resembling a virtual dashboard.

At regular intervals, the survey system 50 is reactivated to map the mine tunnel, in the manner discussed above, past the point where the survey system 50 last left off, since the mine tunnel may have been lengthened, widened, etc. due to the work of the mining vehicle, e.g., the mining vehicle may have drilled past the point the survey system 50 last mapped. The new data collected by the survey system 50 is converted to point cloud data and is transmitted to the three-dimensional database 16 to append the data stored within the database 16. It is contemplated that the survey system 50 may be provided on the mining vehicle itself.

Accordingly, the system 10 of the instant invention is able to map, navigate, position and update the position of a mining vehicle without the use of global positioning systems and dead reckoning systems (except in detecting the IRP). Further, the system 10 is self-contained, i.e., no communications are necessary to outside systems, such as global positioning systems, sonar systems, etc. Additionally, the system 10 includes remote control capabilities and an operator console 20 for controlling and overseeing the functions of the system 10, especially the mining operations from a remote location.

Figure 3:
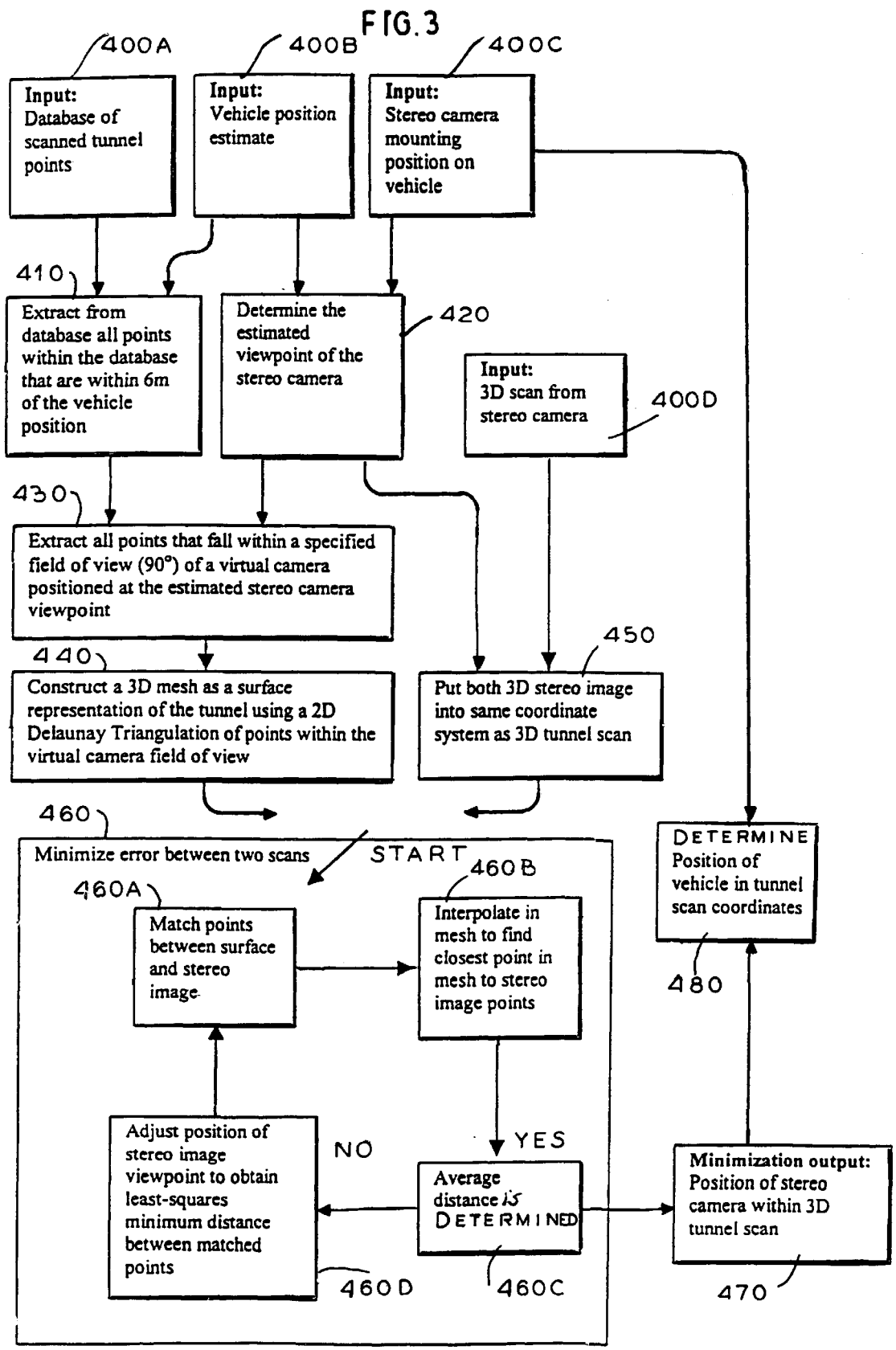
FIG. 3 is a flow chart of a method for mapping and positioning an object according to the invention.

Referring to FIG. 3, a description will now be provided of the algorithm used by the system and method of the instant invention to determine the position of an object in an underground mine and to update the positional data of the object accordingly. As shown by inputs 400A, 400B and 400C, the algorithm uses as inputs the database 16 containing the three-dimensional point cloud data represented the topography of the underground mine (input 400A), the position estimate of the mining vehicle, preferably, in Universal Transverse Mercator ("UTM") coordinates (input 400B), and the mounting position of the three-dimensional camera system 18 on the mining vehicle (input 400C).

The algorithm is embodied in proprietary software available from Point Grey Research Inc. More particularly, the preferred software actually is comprised of two parts. 1) The TRICLOPS Stereo Vision SDK (software development kit) which is the basic stereo vision library; and 2) a Delaunay 2d Mesh library for building and manipulating two dimensional Delaunay triangulations.

In step 410, all point cloud data points are extracted from the database 16 that are within a range of 5–7 m of the vehicle position, i.e., input 400b. In step 420, the estimated viewpoint of the camera system 18 is determined in Universal Transverse Mercator ("UTM") coordinates by applying input 400C to input 400B. In step 430, all point cloud data points from the point cloud data points extracted in step 410 are determined that are within the field of view of a virtual camera positioned at the estimated position (i.e., the position determined in step 420) within a field of view of 90 degrees (both horizontal and vertical field of view). This set of data points represents the topography of the tunnel surface that the camera system 18 should be able to see. This set of tunnel data points is referred hereinafter as TP. FIG. 4 shows an actual tunnel surface comprised of collected point cloud data points.

In step 440, a three-dimensional wire-frame mesh (analogous to the patch of point cloud data described above) with all data points in TP being used as vertices is constructed. This mesh is a surface approximation of the tunnel surface and is created by connecting the data points in TP with mesh edges. The connections are chosen by performing a two-dimensional Delaunay Triangulation, as known in the art, with the data points that result from projecting all data points in TP onto the image plane of the virtual camera. The facets of this mesh approximate the tunnel surface with three-dimensional triangles. In step 450, the estimated position of the camera system 18 determined in step 420 is applied to the point cloud data points obtained from the depth image of the camera system 18 (input 400D) to obtain a set of data points, hereinafter referred to as SP, within the same UTM coordinate system as the wire-frame mesh constructed in step 440.

An iterative least-squares minimization is initiated in step 460 to obtain a correction of the camera position. Step 460 entails that for each point P in SP, the point Q in TP which is closest to P is determined (step 460A); the three-dimensional triangle facet F that has Q as a vertex and has the minimum perpendicular distance to P is determined (step 460B); and a pair point P, PP is created that is the perpendicular projection of P onto F (step 460B). In step 460C, the average distance of all data points in SP from P to PP is determined and whether the average distance is greater than a stopping threshold, e.g., 3 cm. If no, then step 460D is performed to adjust the estimated camera position determined in step 420 to minimize the sum of the squares of the distances P to PP. The iterative loop then proceeds back to step 460A.

If the answer in step 460C is yes, then step 460 outputs the corrected position of the camera system 18 within the three-dimensional tunnel scan (output 470). Step 480 entails using the corrected position of the camera system 18 (output 470) and the mounting position of the camera system 18 on the mining vehicle (input 400C) and reversing the coordinate system transformation (using a homogeneous coordinate transformation technique) as known in the art to determine a new position for the mining vehicle. This new position is the updated mining vehicle position within the UTM coordinate system which is used to update the positional data of the mining vehicle as described above, i.e., replace the current input 400B.

It is noted that UTM is a standard mapping grid system based on known mercator projections that the HORTA™ inertial navigation system 12 reports positions in. It generates a Northing, Easting and Altitude in the UTM coordinate system.

UTM is in the metric system. However, since many mines are already plotted using English measurements, it is necessary to convert the metric UTM coordinate system to the English unit Modified Basin System ("MBS") using conversion equations as known in the art.

Although the above discussion primarily relates to a self-contained mapping and positioning system for underground mining where a three-dimensional camera system is placed on the mining vehicle, such as a drill jumbo, the underlying inventive concept can be miniaturized so that a person walking in an accessible area could quickly and accurately generate a scan and convert the scan into point cloud data for determining the position of the person. Moreover, the instant automated concept may be applied for use with other types of automated and/or remote controlled machines, such as production drills, explosive loaders, robots, trucks, scoop trams, loaders, etc.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A system for determining a position of an object, said system comprising:

means for determining an initial reference point of said object;

means for estimating a position of said object after said object has moved from said initial reference point;

means for scanning at least one image of a surface in proximity to said object and converting said at least one image into a patch of point cloud data;

means for approximately matching said patch of point cloud data with a portion of point cloud data stored within at least one database, wherein said point cloud data stored within said at least one database represents the topography of a region which includes said surface in proximity to said object; and at least one processor for executing programmable instructions for determining a particular location of said region represented by said portion of point cloud data, wherein said object is determined to be positioned in proximity to said particular location.

2. The system according to claim 1, further comprising means for updating at least one processor associated with said object with the determined position of said object.

3. The system according to claim 1, further comprising display means for displaying at least the determined position of said object.

4. The system according to claim 1, further comprising:

a survey system having means for obtaining mapping data representing the topography of said region and means for outputting said mapping data;

converting means for receiving said mapping data and converting said mapping data into said point cloud data; and at least one network device for receiving said point cloud data from said converting means and routing said point cloud data to said at least one database.

5. The system according to claim 4, wherein said means for obtaining mapping data includes a three-dimensional sensor for mapping the topography of said region along the X, Y and Z axes.

6. The system according to claim 1, wherein said at least one processor further executes programmable instructions for removing a subset of point cloud data from said at least one database, wherein said removed subset of point cloud data includes said portion of point cloud data representing said particular location.

7. The system according to claim 6, wherein said portion of point cloud data is a subset of said removed subset of point cloud data.

8. The system according to claim 1, further comprising an operator console in communication with said means for determining said initial reference point of said object and said means for scanning said at least one image of said surface in proximity to said object for transmitting at least one signal to said means for determining and said means for scanning.

9. The system according to claim 8, wherein said operator console is connected to said at least one database and at least one network device via a data bus.

10. The system according to claim 1, further comprising a laser system coupled to said object for determining the distance of said object from an obstacle located in proximity to said object.

11. The system according to claim 1, wherein said means for scanning includes a camera system having three lenses, with one lens being oriented in the X-axis, one lens being oriented in the Y-axis, and one lens being oriented in the Z-axis, wherein said camera system scans said surface in three dimensions.

12. The system according to claim 1, wherein said point cloud data stored within said at least one database represents the topography of said region in three dimensions.

13. The system according to claim 1, wherein said system further comprises a diagnostic terminal system for executing diagnostic procedures for checking the integrity of said system.

14. The system according to claim 1, wherein said region is selected from the group consisting of a mine, a tunnel, a cave, a building, and an overhead surface.

15. A method for determining a position of an object, said method comprising the steps of:

determining an initial reference point of said object;

estimating a position of said object after said object has moved from said initial reference point;

scanning at least one image of a surface in proximity to said object;

converting said at least one image into a patch of point cloud data;

approximately matching said patch of point cloud data with a portion of point cloud data stored within at least one database, wherein said point cloud data stored within said at least one database represents the topography of a region; and determining a particular location of said region represented by said portion of point cloud data, wherein said object is determined to be positioned in proximity to said particular location.

16. The method according to claim 15, further comprising the step of updating at least one processor associated with said object with the determined position of said object.

17. The method according to claim 15, further comprising the step of displaying at least the determined position of said object.

18. The method according to claim 15, further comprising the steps of:

obtaining mapping data representing the topography of said region;

converting said mapping data into said point cloud data; and routing said point cloud data to said at least one database.

19. The method according to claim 18, wherein said step of obtaining mapping data includes the step of mapping the topography of said region along the X, Y and Z axes.

20. The method according to claim 15, further comprising the step of removing a subset of point cloud data from said at least one database prior to said step of approximately matching, wherein said removed subset of point cloud data includes said portion of point cloud data representing said particular location.

21. The method according to claim 15, wherein said step of scanning includes the step of scanning said surface in three dimensions.

22. The method according to claim 15, wherein said region is selected from the group consisting of a mine, a tunnel, a cave, a building, and an overhead surface.

23. An algorithm for determining a position of an object within an underground mine, said algorithm comprising the steps of:

determining an initial reference point of said object within said underground mine;

estimating a position of said object after said object has moved from said initial reference point;

converting at least one scanned image of a surface of said underground mine in proximity to said object into a patch of point cloud data;

approximately matching said patch of point cloud data with a portion of point cloud data stored within at least one database, wherein said point cloud data stored within said at least one database represents the topography of said underground mine; and determining a particular location within said underground mine represented by said portion of point cloud data, wherein said object is determined to be positioned in proximity to said particular location.

24. The algorithm according to claim 23, further comprising the step of updating at least one processor associated with said object with the determined position of said object.

25. The algorithm according to claim 23, further comprising the step of instructing at least one display to display at least the determined position of said object.

26. The algorithm according to claim 23, further comprising the steps of:

obtaining mapping data representing the topography of said underground mine;

converting said mapping data into said point cloud data; and routing said point cloud data to said at least one database.

27. The algorithm according to claim 26, wherein said step of obtaining mapping data includes the step of instructing at least one scanning device to scan the topography of said underground mine along the X, Y and Z axes.

28. The algorithm according to claim 23, further comprising the step of removing a subset of point cloud data from said at least one database prior to said step of approximately matching, wherein said removed subset of point cloud data includes said portion of point cloud data representing said particular location.

* * * * *